US012339760B2

(12) United States Patent
Yim et al.

(10) Patent No.: US 12,339,760 B2
(45) Date of Patent: *Jun. 24, 2025

(54) LAUNCHING DETERMINATION BASED ON LOGIN STATUS

(71) Applicant: GOOGLE LLC, Mountain View, CA (US)

(72) Inventors: Keun Soo Yim, San Jose, CA (US); Zhitu Chen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,016

(22) Filed: Apr. 29, 2024

(65) Prior Publication Data
US 2024/0281358 A1    Aug. 22, 2024

Related U.S. Application Data

(63) Continuation of application No. 18/082,492, filed on Dec. 15, 2022, now Pat. No. 11,971,801.

(51) Int. Cl.
*G06F 11/34* (2006.01)
(52) U.S. Cl.
CPC .............. *G06F 11/3438* (2013.01)
(58) Field of Classification Search
CPC ...... G06F 11/3438; G06F 11/34; G06F 9/451; G06F 9/445; H04L 67/535; H04L 43/00
USPC ........................................................ 709/223
See application file for complete search history.

(56) References Cited

U.S. PATENT DOCUMENTS

| 7,076,616 | B2 | 7/2006 | Nguyen | |
|---|---|---|---|---|
| 7,837,572 | B2 | 11/2010 | Bissonnette | |
| 8,181,206 | B2 * | 5/2012 | Hasek | H04N 21/2225 725/115 |
| 8,525,808 | B1 | 9/2013 | Buening | |
| 9,413,748 | B2 * | 8/2016 | Leung | H04L 63/10 |
| 9,508,040 | B2 | 11/2016 | Bilal | |
| 2009/0044146 | A1 | 2/2009 | Patel | |

(Continued)

OTHER PUBLICATIONS

"Firebase Dynamic Links" Retrieved from https://rsvp.withgoogle.com/events/firebase-dev-summit/forms/registration. 3 pages, dated Aug. 24, 2022.

(Continued)

*Primary Examiner* — Sargon N Nano
(74) *Attorney, Agent, or Firm* — Gray Ice Higdon

(57) ABSTRACT

Implementations determine log-in information indicating whether a user of a first application is logged into a target application and/or a website of the target application. In response to the log-in information indicating that the user is logged into the target application but not logged into the website of the target application, a first selectable element can be displayed at a user interface of the first application to receive user input that causes the target application to be opened. In response to the log-in information indicating that the user is not logged into the target application but is logged into the website of the target application, a second selectable element can be displayed at the first application to receive user input that leads to the website of the target application, or the first selectable element can be assigned a deeplink that leads to the website of the target application.

20 Claims, 10 Drawing Sheets

(56) References Cited

U.S. PATENT DOCUMENTS

| | | |
|---|---|---|
| 2014/0067312 A1 | 3/2014 | Africa, Jr. |
| 2014/0181944 A1 | 6/2014 | Ahmed |
| 2016/0255088 A1 | 9/2016 | Kaplan |
| 2018/0088752 A1* | 3/2018 | Wakerly .................. G06F 40/14 |
| 2018/0143744 A1* | 5/2018 | Movsisyan ............... G06F 8/38 |
| 2020/0106850 A1 | 4/2020 | Popowitz et al. |
| 2021/0264900 A1* | 8/2021 | Reece ..................... G06F 3/167 |
| 2021/0399914 A1* | 12/2021 | Gouleau .............. H04L 12/282 |

OTHER PUBLICATIONS

"Flutter-Start app with different routes depending on login state" 5 pages.
"Deep Link Support" Absorb LMS Support & Training. 4 pages.
European Patent Office; International Search Report and Written Opinion issued in Application No. PCT/US2022/053140; 17 pages; dated Sep. 20, 2023.

* cited by examiner

LAUNCHING DETERMINATION BASED ON LOGIN STATUS

BACKGROUND

Users, when using a client device (e.g., smart phone) or a particular application running at the client device, are often presented with a plurality of graphical user interface (GUI) elements. The plurality of GUI elements can include a selectable element for a target application, which when selected, causes the target application to be launched.

However, the target application can often have an associated website providing the same or similar content and functions as the target application, and a user can log into the target application or the associated website using the same credentials (username and password). In this case, when the selectable element is selected, whether to launch the target application or the associated website for the target application is a practical issue to be solved, to avoid unnecessary user input (e.g., username and password for the target application). Such unnecessary user input can prolong interaction of the user with the client device and cause excess utilization of battery, processor, and/or other resources of the client device.

SUMMARY

Implementations disclosed herein relate to determining log-in information (e.g., target application log-in status for a target application and/or website log-in status for a website associated with the target application), to determine whether to launch, or cause launching of, the target application or the website associated with the target application (sometimes referred to as "website of the target application"). In various implementations, based on the determined log-in information, a first selectable element can be displayed to receive user selection that leads to the launch of the target application, or a second selectable element can be displayed to receive user selection that leads to the launch of the website associated with the target application.

Alternatively, in various implementations, a selectable element can be displayed at an application that is currently running at a client device before the log-in information is determined. The selectable element can suggest additional content or action performable via the target application distinct from the application or the website of the target application. The selectable element can be, for instance, generated based on content a user of the client device is currently accessing using the application. In this case, if the log-in information indicates that the user is logged into the target application but not logged into the website of the target application at the client device, the displayed selectable element can be assigned or embedded with a deeplink (may be referred to as "target application deeplink") that leads to the target application. Alternatively, if the log-in information indicates that the user is logged into the website of the target application but not logged into the target application, the displayed selectable element can be assigned or embedded with a deeplink ("website deeplink") that leads to the website of the target application.

In various implementations, the log-in information can include, or can indicate: a target application log-in status of a target application, and/or a website log-in status of the website that is associated with the target application. The log-in information in these implementations can be shared with, or acquired by, the client device, the application that is currently running at the client device, or an automated assistant. After acquiring such log-in information, the client device (or the application or the automated assistant) can select or generate the aforementioned first or second selectable element, or can assign an already displayed selectable element with a corresponding deeplink (e.g., be it the target application deeplink or the website deeplink).

As a practical example, in various implementations, a user of a client device can use the client device to access an application such as a social media application. Based on content the user browses when using the social media application, the client device can, e.g., via the social media application or an automated assistant installed at or accessible via the client device, select a selectable element from one or more candidate selectable elements, for display at a user interface of the client device (e.g., a user interface of the social media application). The one or more candidate selectable elements can include: a first selectable element that, when selected, cause execution of a target application deeplink to launch a target application (e.g., grocery-ordering application) that is distinct from the social media application, and/or a second selectable element that, when selected, causes execution of a website deeplink to launch a website of the target application (e.g., grocery-ordering application).

In selecting the selectable element from the one or more candidate selectable elements, various implementations utilize log-in information of the user, where the log-in information of the user can include, or otherwise indicate, a target application log-in status of the target application for the user shared by the target application, and/or a website log-in status of the associated website for the user shared by the website of the target application. The target application log-in status can be shared by the target application with the client device, the application running at the client device, or the automated assistant. Similarly, the website log-in status can be shared by the website of the target application with the client device, the application running at the client device, or the automated assistant.

The website of the target application, while being associated with the target application, can be accessible independent of the target application. For instance, the user may have logged into the website of the target application, e.g., using credentials such as username and password. In this instance, the target application can be installed at the client device, and the user can be logged out of the target application after logging in using the aforementioned credentials. As another instance, the user may have saved the credentials at the target application for automatically log-in of the target application and/or have saved the credentials at the website associated with the target application for automatically log-in of the website associated with the target application. As a further instance, the user may never use the website (even if there is one) associated with the target application, while staying logged-in for the target application installed at the client device (such as a cellphone) of the user. These instances, however, are not intended to be limiting, and there are other applicable scenarios.

In some implementations, the log-in information of the user can indicate that the target application log-in status shows that the user is logged into the target application. In response to the log-in information of the user indicating that the target application log-in status shows that the user is logged into the target application, the client device (e.g., via the social media application or the automated assistant) can select the first selectable element and in response to the selecting, display the first selectable element at the user interface of the social media application. In these implementations, the user can select the displayed first selectable element, and in response to the user selecting the first selectable element, the target application deeplink for the target application can be executed to launch the target application.

Optionally, the target application deeplink for the target application (e.g., grocery-ordering app) can include a state indicator (e.g., digit and/or letter that represent a particular state of the target application, or a natural language description of a particular state of the target application), and execution of the deeplink can cause the target application to be opened in the particular state that is reflected in the target application deeplink. For instance, the target application (e.g., grocery-ordering app) can be launched to display a particular user interface listing options to purchase apples, and the user can interact with the particular user interface to add one or more apples in a particular type and from a particular farm/brand to a shopping cart of the grocery-ordering app. In this instance, the user can continue to check out the shopping cart without entering credentials (e.g., username and password) for the target application because the user is already logged into the target application, or the user can return back to the social media application and check out (or edit) the shopping cart of the target application later.

In some implementations, the log-in information of the user can indicate that the target application log-in status shows that the user is not logged into the target application. In response to the log-in information of the user indicating that the target application log-in status shows that the user is not logged into the target application, the client device (e.g., via the social media application or the automated assistant) can determine to not display the aforementioned first selectable element.

In some implementations, the log-in information of the user can indicate that the target application log-in status shows that the user is not logged into the target application and can further indicate that the website log-in status shows that the user is logged into the website associated with the target application. In this case, the client device (e.g., via the social media application or the automated assistant) can determine to display the second selectable element, and display the second selectable element at the user interface of the social media application. In these implementations, the user can select the displayed second selectable element, and in response to the user selecting the second selectable element, the website deeplink for the website of the target application can be executed to launch the website of the target application.

Optionally, the website deeplink for the website of the target application can be, or can include, an address to a particular webpage that belongs to the website of the target application, and execution of the website deeplink can cause the particular webpage to be launched. For instance, the particular webpage, within the website of the target application, can provide additional content recommended to the user based on the content the user browses using the social media application. As another instance, the particular webpage, within the website of the target application, can enable the user to perform an action (e.g., add a bottle of apple juice to an electronic shopping cart) that is recommended to the user based on the content the user browses using the social media application.

In some implementations, the log-in information of the user can indicate that the website log-in status for the website of the target application shows that the user is not logged into the website of the target application. In response to the log-in information of the user indicating that the website log-in status shows that the user is not logged into the website of the target application, the client device (e.g., via the social media application or the automated assistant) can determine to not display the aforementioned second selectable element.

As another practical example, in various implementations, a user of a client device can use the client device to access an application such as a music application. Based on content the user browses when using the music application, the client device can (e.g., via the music application or an automated assistant installed at or accessible via the client device) select a selectable element from one or more candidate selectable elements, for display at a user interface of the client device (e.g., a user interface of the music application). The one or more candidate selectable elements can include: a first selectable element that, when selected, cause execution of a target application deeplink to launch a target application (e.g., ticketing application) that is distinct from the music application; a second selectable element that, when selected, causes execution of a website deeplink to launch a website of the target application (e.g., ticketing application); and/or a third selectable element that, when selected, cause execution of a browser deeplink to launch a browser that is distinct from the target application.

In selecting the selectable element from the one or more candidate selectable elements, various implementations utilize log-in information of the user, where the log-in information of the user can include, or otherwise indicate, a target application log-in status of the target application for the user shared by the target application, and/or a website log-in status of the associated website for the user shared by the website of the target application. The target application log-in status can be shared by the target application with the client device, the application running at the client device, or the automated assistant. Similarly, the website log-in status can be shared by the website of the target application with the client device, the application running at the client device, or the automated assistant.

The website of the target application, while being associated with the target application, can be accessible independent of the target application. For instance, the user may have logged into the website of the target application, e.g., using credentials such as username and password. In this instance, the target application can be installed at the client device, and the user can be logged out of the target application after logging in using the aforementioned credentials. As another instance, the user may have saved the credentials at the target application for automatically log-in of the target application and/or have saved the credentials at the website associated with the target application for automatically log-in of the website associated with the target application. As a further instance, the user may never use the website (even if there is one) associated with the target application, while staying logged-in for the target application installed at the client device (such as a cellphone) of the user. These instances, however, are not intended to be limiting, and there are other applicable scenarios.

In some implementations, the log-in information of the user can indicate that the target application log-in status shows that the user is logged into the target application. In response to the log-in information of the user indicating that the target application log-in status shows that the user is logged into the target application, the client device (e.g., via the music application or the automated assistant) can select the first selectable element and in response to the selecting, display the first selectable element at the user interface of the social media application. In these implementations, the user can select the displayed first selectable element, and in response to the user selecting the first selectable element, the target application deeplink for the target application can be executed to launch the target application.

Optionally, the target application deeplink for the target application can include a state indicator (e.g., digit and/or letter that represent a particular state of the target application, or a natural language description of a particular state of the target application), and execution of the deeplink can cause the target application to be opened in the particular state that is reflected in the target application deeplink.

In some implementations, the log-in information of the user can indicate that the target application log-in status shows that the user is not logged into the target application. In response to the log-in information of the user indicating that the target application log-in status shows that the user is not logged into the target application, the client device (e.g., via the music application or the automated assistant) can determine to not display the aforementioned first selectable element.

In some implementations, the log-in information of the user can indicate that the target application log-in status shows that the user is not logged into the target application and can further indicate that the website log-in status shows that the user is logged into the website of the target application. In this case, the client device (e.g., via the music application or the automated assistant) can determine to display the second selectable element, and display the second selectable element at the user interface of the social media application. In these implementations, the user can select the displayed second selectable element, and in response to the user selecting the second selectable element, the website deeplink for the website of the target application can be executed to launch the website of the target application.

Optionally, the website deeplink for the website of the target application can be, or can include, an address to a particular webpage that belongs to the website of the target application, and execution of the website deeplink can cause the particular webpage to be launched. For instance, the particular webpage, within the website of the target application, can provide additional content recommended to the user based on the content the user browses using the music application. As another instance, the particular webpage, within the website of the target application, can enable the user to perform an action (e.g., add a concert ticket to an electronic shopping cart) that is recommended to the user based on the content the user browses using the music application.

In some implementations, the log-in information of the user can indicate that the website log-in status for the website of the target application shows that the user is not logged into the website of the target application. In response to the log-in information of the user indicating that the website log-in status shows that the user is not logged into the website of the target application, the client device (e.g., via the social media application or the automated assistant) can determine to not display the aforementioned second selectable element.

In some implementations, the log-in information of the user can, in addition to indicating that the target application log-in status shows that the user is not logged into the target application, indicate that the website log-in status for the website of the target application shows that the user is not logged into the website of the target application. In this case, in response to the log-in information indicating that the target application log-in status shows that the user is not logged into the target application and that the website log-in status for the website of the target application shows that the user is not logged into the website of the target application, the client device (e.g., via the music application or the automated assistant) can determine to display the third selectable element, and display the third selectable element at the user interface of the music application. In these implementations, the user can select the displayed third selectable element, and in response to the user selecting the third selectable element, the browser deeplink for the target application can be executed to launch the browser.

Optionally, the browser can be a default browser, or can be a browser that the user is logged into. Optionally, the browser deeplink can be, or can include, an address to a particular website or to a particular webpage, so that when the browser deeplink is executed, the particular website or the particular webpage can be launched for display to the user. As a non-limiting example, the content that the user browses using the music application is a song by a particular singer, and the third selectable element can be embedded with the browser deeplink that leads to a ticketing page of a concert of the particular singer. In this example, when the user selects the third selectable element, the ticketing page of the concert can be launched for the user to access additional content (e.g., ticketing information of the concert of the particular singer) via the browser.

As a further practical example, in various implementations, a user of a client device can use the client device to access an application such as a social media application. Based on content the user browses when using the social media application, the client device can, e.g., via the social media application or an automated assistant installed at or accessible via the client device, determine target content accessible via a target application (e.g., grocery-ordering application) that is distinct from the application the user is currently accessing (e.g., the social media application) or a website of the target application. In this case, the client device can (e.g., via the social media application or the automated assistant) display a particular selectable element that, when selected, launches the target content accessible via the target application or via the website of the target application.

In some implementations, the user can select the particular selectable element, and in response to the user selecting the particular selectable element, the client device can (e.g., via the social media application or the automated assistant) determine log-in information of the user. The log-in information of the user can include, or otherwise indicate, a target application log-in status of the target application for the user shared by the target application, and/or a website log-in status of the associated website for the user shared by the website of the target application. The target application log-in status can be shared by the target application with the client device, the application running at the client device, or the automated assistant. Similarly, the website log-in status can be shared by the website of the target application with the client device, the application running at the client device, or the automated assistant.

In some implementations, the log-in information of the user can indicate that the target application log-in status shows that the user is logged into the target application. In response to the log-in information of the user indicating that the target application log-in status shows that the user is logged into the target application, the client device (e.g., via the social media application or the automated assistant) can embed the displayed particular selectable element with a target application deeplink for the target application. The target application deeplink can be executed responsive to the user selecting the particular selectable element, to launch the target application.

Optionally, the target application deeplink for the target application (e.g., grocery-ordering app) can include a state indicator (e.g., digit and/or letter that represent a particular state of the target application, or a natural language description of a particular state of the target application), and execution of the deeplink can cause the target application to be opened in the particular state that is reflected in the target application deeplink. For instance, the target application (e.g., grocery-ordering app) can be launched to display a particular user interface listing options to purchase apples, and the user can interact with the particular user interface to add one or more apples in a particular type and from a particular farm/brand to a shopping cart of the grocery-ordering app. In this instance, the user can continue to check out the shopping cart without entering credentials (e.g., username and password) for the target application because the user is already logged into the target application, or the user can return back to the social media application and check out (or edit) the shopping cart of the target application later.

In some implementations, the log-in information of the user can indicate that the target application log-in status shows that the user is not logged into the target application and can further indicate that the website log-in status shows that the user is logged into the website of the target application. In this case, the client device (e.g., via the social media application or the automated assistant) can assign or embed the displayed particular selectable element with a website deeplink for the website of the target application. The website deeplink can be executed responsive to the user selecting the particular selectable element, to launch the website of the target application.

Optionally, the website deeplink for the website of the target application can be, or can include, an address to a particular webpage that belongs to the website of the target application, and execution of the website deeplink can cause the particular webpage to be launched. For instance, the particular webpage, within the website of the target application, can provide additional content recommended to the user based on the content the user browses using the social media application. As another instance, the particular webpage, within the website of the target application, can enable the user to perform an action (e.g., add a bottle of apple juice to an electronic shopping cart) that is recommended to the user based on the content the user browses using the social media application.

In some implementations, the log-in information of the user can indicate that the target application log-in status shows that the user is not logged into the target application and can further indicate that the website log-in status shows that the user is not logged into the website of the target application. In response to the log-in information of the user indicating that the target application log-in status shows that the user is not logged into the target application and can further indicate that the website log-in status shows that the user is not logged into the website of the target application, the client device (e.g., via the social media application or the automated assistant) can display an error message or a default webpage responsive to the user selecting the particular selectable element.

Implementations disclosed herein seek to ensure that a selectable element, when selected, leads to launching of one of a target application or a website that is already in a logged-in status. In these and other manners, additional user inputs to log-in are obviated, and associated client device resources, that are required in logging-in, are not utilized. Further, some implementations, when both a target application and a website have a logged-in status, provide a selectable element that, when selected, leads to launching of the target application in lieu of the website. The target application can present an optimized interface, relative to the website, that enables a corresponding user interaction to be concluded more quickly, resulting in more efficient utilization of client device resources in performing the user interaction.

The above is provided merely as an overview of some implementations. Those and/or other implementations are disclosed in more detail herein.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

The above and other aspects, features, and advantages of certain implementations of the present disclosure will be more apparent from the following description taken in conjunction with the accompanying drawings. In the drawings.

DETAILED DESCRIPTION

The following description with reference to the accompanying drawings is provided for understanding of various implementations of the present disclosure. It's appreciated that different features from different implementations may be combined with and/or exchanged for one another. In addition, those of ordinary skill in the art will recognize that various changes and modifications of the various implementations described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used to enable a clear and consistent understanding of the present disclosure. Accordingly, it should be apparent to those skilled in the art that the following description of various implementations of the present disclosure is provided for the purpose of illustration only and not for the purpose of limiting the present disclosure as defined by the appended claims and their equivalents.

Figure 1A:
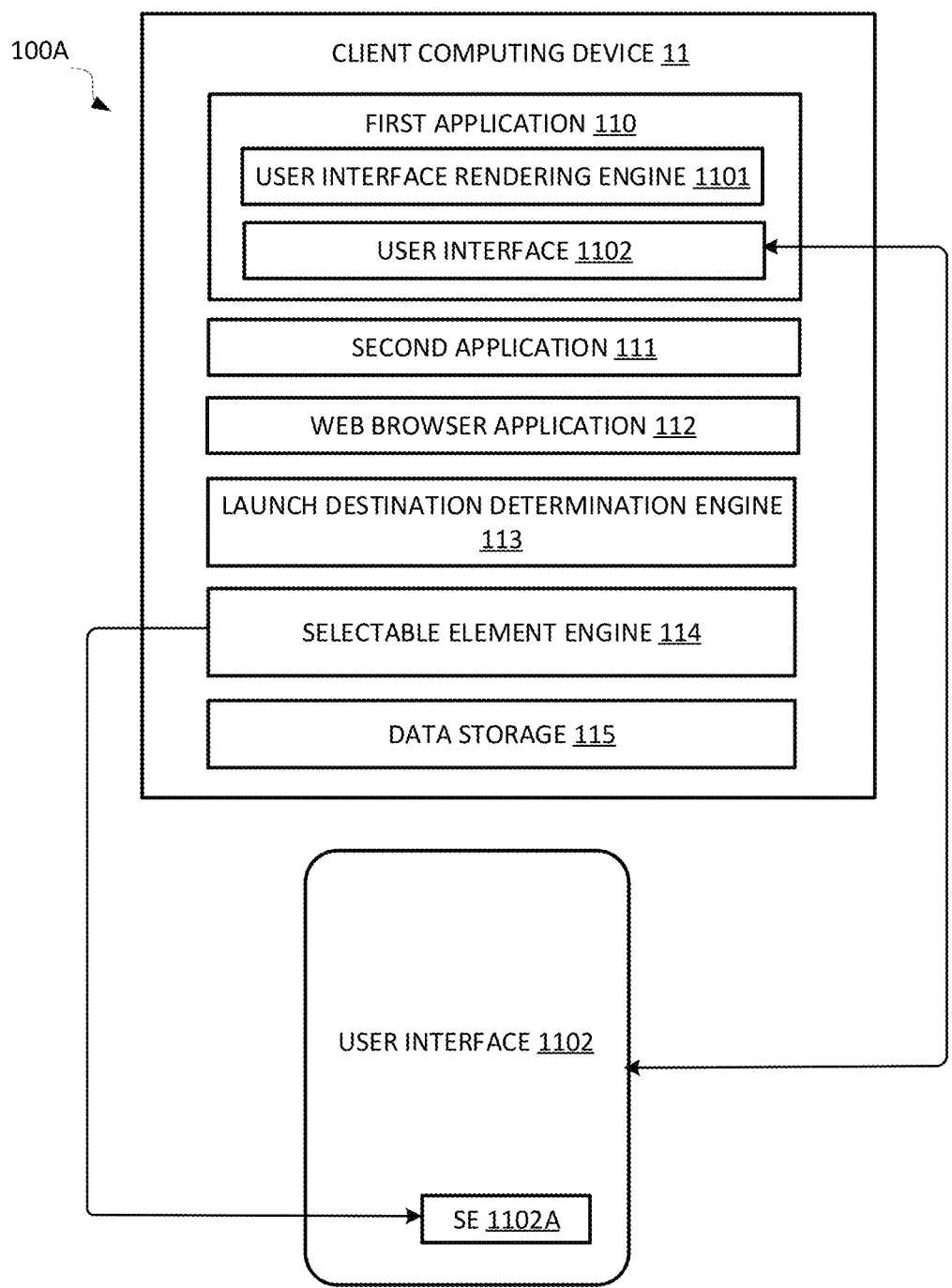
FIG. 1A is a block diagram of an example environment that demonstrates various aspects of the present disclosure, and in which implementations disclosed herein may be implemented.
Figure 1B:
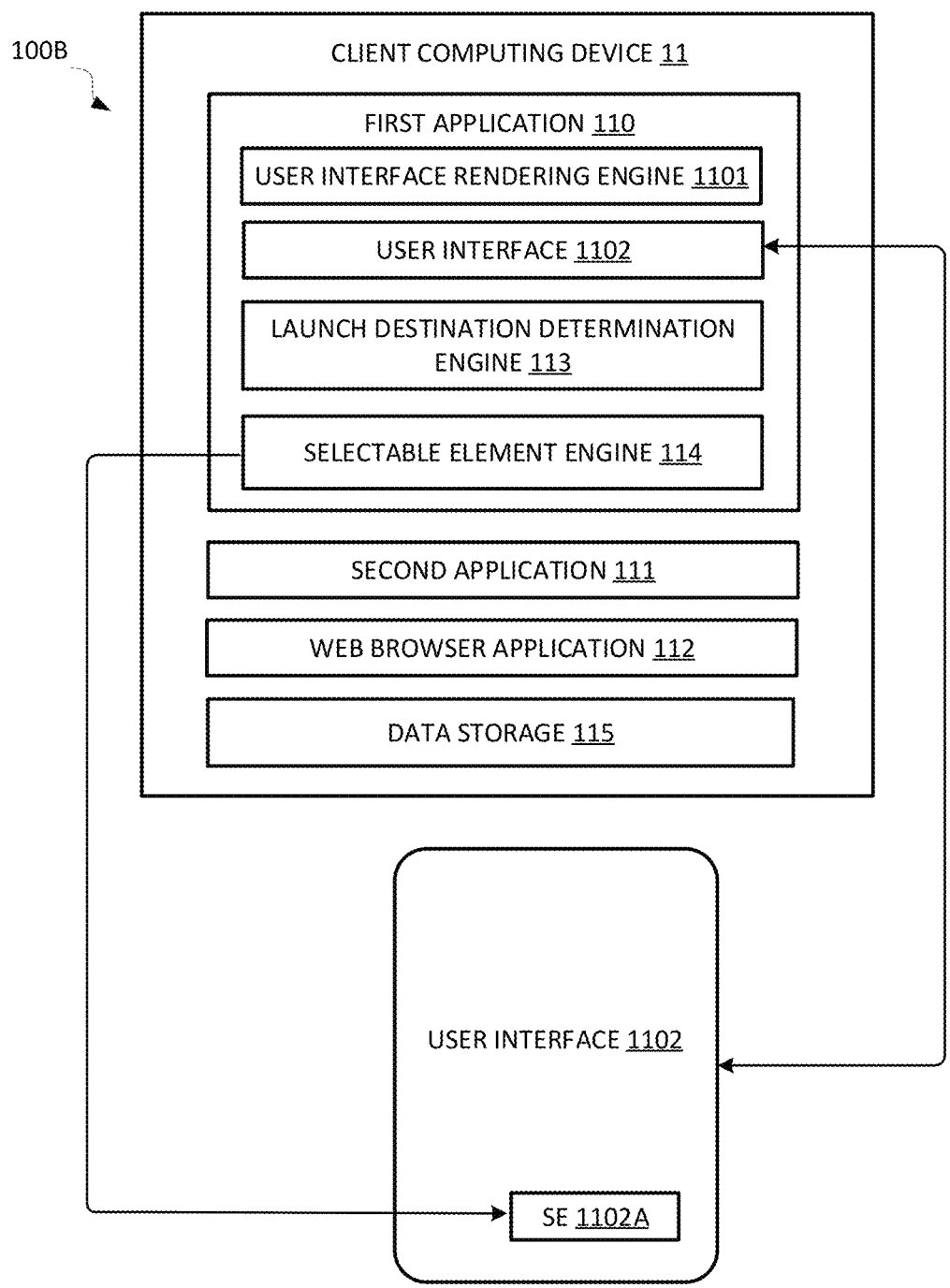
FIG. 1B is a block diagram of another example environment that demonstrates various aspects of the present disclosure, and in which implementations disclosed herein may be implemented.

FIG. 1A is a block diagram of an example environment 100A that demonstrates various aspects of the present disclosure, and in which implementations disclosed herein may be implemented. FIG. 1B is a block diagram of another example environment 100B that demonstrates various aspects of the present disclosure, and in which implementations disclosed herein may be implemented. As shown in FIG. 1A, the environment 100A can include a client computing device 11 (may be referred to simply as "client device") that includes a first application 110, a second application 111, and a browser application 112.

The client computing device 11 can be, for example, a cell phone, a laptop, a desktop, a notebook computer, a tablet, a smart TV, a messaging device, or a personal digital assistant (PDA), and the present disclosure is not limited thereto. The first application 110 can include a user interface rendering engine 1101 to render a user interface 1102 via the client computing device 11. The first application 110, for instance, can be a social media application, a music application, a messaging application, or any other applicable application accessible or installed at the client computing device 11.

The second application 111 can be distinct and separate from the first application 110. Optionally, the second application 111 can be further distinct and separate from the browser application 112. As a non-limiting example, the second application 111 can be a grocery-ordering application, while the first application 110 is a social media application and the browser application 112 is a web browser. In various implementations, a user of the client computing device 11, once logged into the second application using credentials such as a username and a password corresponding to the username, can stay logged into the second application even after closing or exiting the second application 111. In various implementations, the second application can have an associated website accessible via the browser application 112 (or another browser not illustrated in FIG. 1A), and the user can log into the website of the second application using the same credentials used to log into the second application. In these implementations, alternatively or additionally, the user can stay logged into the website of the second application even after the website of the second application 111 is closed.

In various implementations, the client computing device 11 can further include a launch destination determination engine 113, a selectable element engine 114, and/or a data storage 115. In some implementations, the user can be browsing content using the first application 110, where the content that the user is browsing triggers additional content or an action accessible via the second application 111. In these implementations, a particular selectable element (e.g., SE 1102A in FIG. 1A) can be displayed by the selectable element engine 114 for receiving user input that triggers access to the additional content or the action via the second application 111. In this case, the launch destination determination engine 113 can be configured to assign a deeplink for the second application 111 or a deeplink for the website of the second application 111, to the displayed particular selectable element, where such assignment can be based on log-in information acquired by the launch destination determination engine 113 from the second application 111 and/or from the browser application 112.

Alternatively, the launch destination determination engine 113 can be configured to determine and inform the selectable element engine 114, whether to display a first selectable element directing the user to the second application 111 or to display a second selectable element directing the user to the website associated with the second application 111, based on the log-in information acquired from the second application 111 and/or the browser application 112. The first selectable element, the second selectable element, along with other selectable elements that form a plurality of selectable elements can be stored in the data storage 115. For instance, the graphical features and location information of the first selectable element can be included in metadata associated with the second application 111, and can be stored in the data storage 115. Similarly, the graphical features and location information of the second selectable element can be included in metadata associated with the second application 111, and can be stored in the data storage 115.

In some implementations, the launch destination determination engine 113 can be configured to communicate with one or more of the aforementioned applications or website to determine log-in information of a user account of the user for each of the aforementioned applications or website. For instance, the launch destination determination engine 113 can communicate with the second application 111 to determine log-in information of a user account of the user associated with the second application 111, where such log-in information of the user account of the user associated with the second application 111 can indicate a second application log-in status (i.e., whether the user is logged into the second application or not). In this instance, the second application 111 can share the log-in information of the user account of the user associated with the second application 111 with the launch destination determination engine 113, for the launch destination determination engine 113 to determine whether the user is logged into the second application. Alternatively, the second application 111 can decline to share such log-in information with the launch destination determination engine 113, and the launch destination determination engine 113 can determine that the second application log-in status of the second application 111 is inaccessible.

For instance, the launch destination determination engine 113 can communicate with the second application 111 to determine log-in information of a user account of the user associated with the second application 111, where such log-in information of the user account of the user associated with the second application 111 can indicate a second application log-in status (i.e., whether the user is logged into the second application 111 or not) and/or a website log-in status (i.e., whether the user is logged into the website of the second application 111) of the website associated with the second application 111. In this instance, the second application 111 can share the log-in information of the user account of the user associated with the second application 111 with the launch destination determination engine 113, for the launch destination determination engine 113 to determine whether the user is logged into the second application 111 and/or the website of the second application 111. Alternatively, the second application 111 can decline to share such log-in information with the launch destination determination engine 113, and the launch destination determination engine 113 can determine that the second application log-in status of the second application 111 and/or the website log-in status of the website associated with the second application 111, are inaccessible.

Similarly, the launch destination determination engine 113 can communicate with the browser application 112 to determine log-in information for a user account of the user associated with the browser application 11, where such log-in information of the user account of the user associated with the browser application 112 can indicate a browser application log-in status (i.e., whether the user is logged into the browser application or not). In this instance, the browser application 112 can share the log-in information of the user account of the user associated with the browser application 112 with the launch destination determination engine 113, for the launch destination determination engine 113 to determine whether the user is logged into the browser application 112. Alternatively, the browser application 111 can decline to share such log-in information with the launch destination determination engine 113, and the launch destination determination engine 113 can determine that the browser application log-in status of the browser application 112 is inaccessible.

Optionally, in some implementations, instead of communicating with the second application 111 to determine the website log-in status (i.e., whether the user is logged into the website of the second application 111) of the website associated with the second application 111, the launch destination determination engine 113 can communicate with the browser application 112 (and/or other browsers not illustrated in FIG. 1A) to determine the website log-in status (i.e., whether the user is logged into the website of the second application 111) of the website associated with the second application 111. For instance, the browser application 112 (and/or other browsers not illustrated in FIG. 1A) may include metadata indicating whether the user has accessed the website of the second application 111 using the browser application 112, whether the user has logged into the website of the second application 111 using the browser application 112, and/or whether the user stays logged into the website of the second application 111 using the browser application 112.

In some implementations, the launch destination determination engine 113 acquires log-in information indicating/including only second application log-in status of the user for the second application 111 (i.e., acquiring no website log-in status of the user for the website of the second application), which indicates/shows that the user is logged into the second application 111. In these implementations, the launch destination determination engine 113 can embed/assign the already displayed particular selectable element with a deeplink that, when executed, causes the second application to be opened. Alternatively, the launch destination determination engine 113 can select the first selectable element, from the plurality of selectable elements that are stored (e.g., in the data storage 115), for display at the user interface 1102 of the first application 110. In this latter case, the launch destination determination engine 113 can inform the selectable element engine 114 to display the first selectable element at the user interface 1102 of the first application 110, and in response, the selectable element engine 114 can display the first selectable element at the user interface 1102.

In some implementations, the launch destination determination engine 113 acquires log-in information indicating/including only second application log-in status of the user for the second application 111 (i.e., acquiring no website log-in status of the user for the website of the second application), which indicates/shows that the user is not logged into the second application 111. In these implementations, the launch destination determination engine 113 can embed/assign the already displayed particular selectable element with a deeplink that, when executed, causes an error message to be displayed at the user interface 1102 (or causes a default webpage to be displayed via the browser application 112, etc.). Alternatively, the launch destination determination engine 113 can determine not to select the first selectable element, from the plurality of selectable elements that are stored (e.g., in the data storage 115), for display at the user interface 1102 of the first application 110. In this case, the launch destination determination engine 113 can inform the selectable element engine 114 to not display the first selectable element at the user interface 1102 of the first application 110, and in response, the first selectable element will not be displayed at the user interface 1102.

In some implementations, the launch destination determination engine 113 acquires log-in information indicating/including only the website log-in status of the user for the website of the second application 111 (i.e., acquiring no second application log-in status of the user for the second application 111), which indicates/shows the user is logged into website of the second application 111. In these implementations, the launch destination determination engine 113 can embed/assign the already displayed particular selectable element with a deeplink that, when executed, causes the website of the second application 111 to be opened. Alternatively, the launch destination determination engine 113 can select the second selectable element, from the plurality of selectable elements that are stored (e.g., in the data storage 115), for display at the user interface 1102 of the first application 110. In this latter case, the launch destination determination engine 113 can inform the selectable element engine 114 to display the second selectable element at the user interface 1102 of the first application 110, and in response, the selectable element engine 114 can display the second selectable element at the user interface 1102.

In some implementations, the launch destination determination engine 113 acquires log-in information indicating/including only the website log-in status of the user for the website of the second application 111 (i.e., acquiring no second application log-in status of the user for the second application 111), which indicates/shows the user is not logged into website of the second application 111. In these implementations, the launch destination determination engine 113 can embed/assign the already displayed particular selectable element with a deeplink that, when executed, causes an error message to be displayed at the user interface 1102 (or causes a default webpage to be displayed via the browser application 112, etc.). Alternatively, the launch destination determination engine 113 can determine not to select the second selectable element, from the plurality of selectable elements that are stored (e.g., in the data storage 115), for display at the user interface 1102 of the first application 110. In this case, the launch destination determination engine 113 can inform the selectable element engine 114 to not display the second selectable element at the user interface 1102 of the first application 110, and in response, the second selectable element will not be displayed at the user interface 1102.

In some implementations, the launch destination determination engine 113 acquires log-in information including only: (1) the second application log-in status of the user for the second application 111, that shows that the user is logged into the second application 111, and (2) the website log-in status of the user for the website of the second application, which indicates/shows that the user is logged into the website of second application 111. In these implementations, the launch destination determination engine 113 can embed/assign the already displayed particular selectable element with a deeplink that, when executed, causes the second application (not the website of the second application) to be opened. Alternatively, the launch destination determination engine 113 can select the first selectable element, from the plurality of selectable elements that are stored (e.g., in the data storage 115), for display at the user interface 1102 of the first application 110. In this latter case, the launch destination determination engine 113 can inform the selectable element engine 114 to display the first selectable element at the user interface 1102 of the first application 110, and in response, the selectable element engine 114 can display the first selectable element at the user interface 1102.

In some implementations, the launch destination determination engine 113 acquires log-in information including only: (1) the second application log-in status of the user for the second application 111, that shows that the user is logged into the second application 111, and (2) the website log-in status of the user for the website of the second application, which indicates/shows that the user is not logged into the website of second application 111. In these implementations, the launch destination determination engine 113 can embed/assign the already displayed particular selectable element with a deeplink that, when executed, causes the second application (not the website of the second application) to be opened. Alternatively, the launch destination determination engine 113 can select the first selectable element, from the plurality of selectable elements that are stored (e.g., in the data storage 115), for display at the user interface 1102 of the first application 110. In this latter case, the launch destination determination engine 113 can inform the selectable element engine 114 to display the first selectable element at the user interface 1102 of the first application 110, and in response, the selectable element engine 114 can display the first selectable element at the user interface 1102.

In some implementations, the launch destination determination engine 113 acquires log-in information including only: (1) the second application log-in status of the user for the second application 111, that shows that the user is not logged into the second application 111, and (2) the website log-in status of the user for the website of the second application, which indicates/shows that the user is logged into the website of second application 111. In these implementations, the launch destination determination engine 113 can embed/assign the already displayed particular selectable element with a deeplink that, when executed, causes the website of the second application to be opened. Alternatively, the launch destination determination engine 113 can select the second selectable element for display at the user interface 1102. In this latter case, the launch destination determination engine 113 can inform the selectable element engine 114 to display the second selectable element at the user interface 1102 of the first application 110, and in response, the selectable element engine 114 can display the second selectable element at the user interface 1102.

In some implementations, the launch destination determination engine 113 acquires log-in information including only: (1) the second application log-in status of the user for the second application 111, that shows that the user is not logged into the second application 111, and (2) the website log-in status of the user for the website of the second application, which indicates/shows that the user is not logged into the website of second application 111. In these implementations, the launch destination determination engine 113 can determine and inform the selectable element engine 114 to not display any selectable element at the user interface 1102 of the first application 110.

In some implementations, the launch destination determination engine 113 acquires log-in information including only: (i) the second application log-in status of the user for the second application 111, that shows that the user is logged into the second application 111; and (ii) a browser log-in status of the user for the browser application 112, indicating whether or not the user is logged into the browser application 112. In these implementations, as long as the user is logged into the second application 111 and regardless of whether or not the user is logged into the browser application 112, the launch destination determination engine 113 can embed/assign the already displayed particular selectable element with a deeplink. Such deeplink, when executed, causes the second application (not the website of the second application) to be opened. Alternatively, the launch destination determination engine 113 can select the first selectable element, from the plurality of selectable elements that are stored (e.g., in the data storage 115), for display at the user interface 1102 of the first application 110. In this latter case, the launch destination determination engine 113 can inform the selectable element engine 114 to display the first selectable element at the user interface 1102 of the first application 110, and in response, the selectable element engine 114 can display the first selectable element at the user interface 1102.

In some implementations, the launch destination determination engine 113 acquires log-in information including only: (i) the second application log-in status of the user for the second application 111, that shows that the user is not logged into the second application 111; and (ii) a browser log-in status of the user for the browser application 112, indicating whether or not the user is logged into the browser application 112. In these implementations, as long as the user is not logged into the second application 111 and regardless of whether or not the user is logged into the browser application 112, the launch destination determination engine 113 can inform the selectable element engine 114 to not display the first selectable element at the user interface 1102 of the first application 110, and in response, the first selectable element will not be displayed at the user interface 1102.

In some implementations, the launch destination determination engine 113 acquires log-in information including only: (i) the second application log-in status of the user for the second application 111, that shows that the user is logged into the website of the second application 111; and (ii) a browser log-in status of the user for the browser application 112, indicating whether or not the user is logged into the browser application 112. In these implementations, as long as the user is logged into the website of the second application 111 and regardless of whether or not the user is logged into the browser application 112, the launch destination determination engine 113 can embed/assign the already displayed particular selectable element with a deeplink. Such deeplink, when executed, causes the website of the second application to be opened. Alternatively, the launch destination determination engine 113 can select the second selectable element for display at the user interface 1102 of the first application 110. In this latter case, the launch destination determination engine 113 can inform the selectable element engine 114 to display the second selectable element at the user interface 1102 of the first application 110, and in response, the selectable element engine 114 can display the second selectable element at the user interface 1102.

In some implementations, the launch destination determination engine 113 acquires log-in information including only: (i) the second application log-in status of the user for the second application 111, that shows that the user is not logged into the website of the second application 111; and (ii) a browser log-in status of the user for the browser application 112, indicating whether or not the user is logged into the browser application 112. In these implementations, as long as the user is not logged into the website of the second application 111 and regardless of whether or not the user is logged into the browser application 112, the launch destination determination engine 113 can inform the selectable element engine 114 to not display the second selectable element at the user interface 1102 of the first application 110, and in response, the second selectable element will not be displayed at the user interface 1102.

In some implementations, the launch destination determination engine 113 acquires log-in information including only: (a) the second application log-in status of the user for the second application 111, that shows that the user is logged into the second application 111, (b) the website log-in status of the user for the website of the second application, which indicates/shows whether or not the user is logged into the website of second application 111, and (c) the browser log-in status of the user for the browser application 112, indicating whether or not the user is logged into the browser application 112. In these implementations, as long as the user is logged into the second application 111 and regardless whether or not the user is logged into the website of the second application 111 or the browser application 112, the launch destination determination engine 113 can embed/assign the already displayed particular selectable element with a deeplink that, when executed, causes the second application (not the website of the second application) to be opened. Alternatively, the launch destination determination engine 113 can select the first selectable element for display at the user interface 1102 of the first application 110. In this latter case, the launch destination determination engine 113 can inform the selectable element engine 114 to display the first selectable element at the user interface 1102, and in response, the selectable element engine 114 can display the first selectable element at the user interface 1102.

In some implementations, the launch destination determination engine 113 acquires log-in information including only: (a) the second application log-in status of the user for the second application 111, that shows that the user is not logged into the second application 111, (b) the website log-in status of the user for the website of the second application, which indicates/shows that the user is logged into the website of second application 111, and (c) the browser log-in status of the user for the browser application 112, indicating whether or not the user is logged into the browser application 112. In these implementations, the launch destination determination engine 113 can embed/assign the already displayed particular selectable element with a deeplink that, when executed, causes the website of the second application to be opened. Alternatively, the launch destination determination engine 113 can select the second selectable element for display at the user interface 1102 of the first application 110. In this latter case, the launch destination determination engine 113 can inform the selectable element engine 114 to display the first selectable element at the user interface 1102, and in response, the selectable element engine 114 can display the first selectable element at the user interface 1102.

In some implementations, the launch destination determination engine 113 acquires log-in information including only: (a) the second application log-in status of the user for the second application 111, that shows that the user is not logged into the second application 111, (b) the website log-in status of the user for the website of the second application, which indicates/shows that the user is not logged into the website of second application 111, and (c) the browser log-in status of the user for the browser application 112, indicating whether or not the user is logged into the browser application 112. In these implementations, the launch destination determination engine 113 can determine and inform the selectable element engine 114 to not display any selectable element at the user interface 1102 of the first application 110. Alternatively, the launch destination determination engine 113 can determine and inform the selectable element engine 114 to display the aforementioned third selectable element at the user interface 1102 of the first application 110, where the third selectable element, when selected, causes a search page of the browser application 112 to be opened/launched.

Figure 1C:
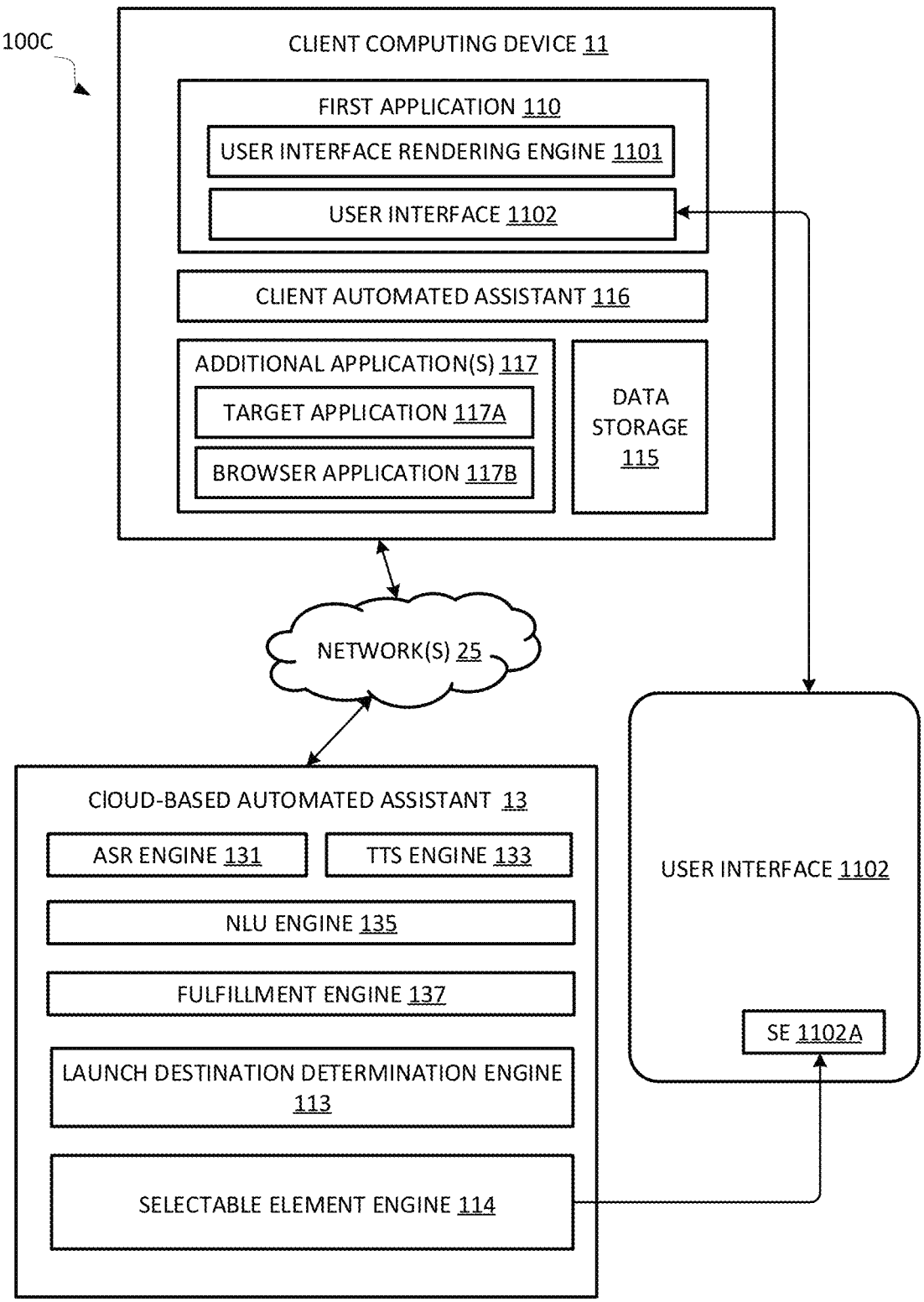
FIG. 1C is a block diagram of a further example environment that demonstrates various aspects of the present disclosure, and in which implementations disclosed herein may be implemented.

Referring to FIG. 1B, descriptions similar to FIG. 1A is omitted, and it's noted that instead of being included in the client computing device 11, the launch destination determination engine 113 and/or the selectable element engine 114 can be included in the first application 110. FIG. 1C is a block diagram of an example environment 100C that demonstrates various aspects of the present disclosure, and in which implementations disclosed herein may be implemented. As shown in FIG. 1C, the client computing device 11, in addition to including the first application 110, can include a client automated assistant application 116 (may be referred to as "client automated assistant"). The one or more additional applications 117 can include a target application 117A (which can be or can correspond to the aforementioned second application 111) and a browser application 117B (which can be or can correspond to the aforementioned browser application 112). Descriptions of one or more components here (e.g., the first application 110, the target application 117A, etc.) can be found elsewhere in this disclosure, and repeated descriptions are omitted for clarity.

As shown in FIG. 1C, the client computing device 11 can be in communication with one or more servers (not shown) via one or more networks 15. For instance, a server, of the one or more servers, can include a cloud-based automated assistant application 13 (or certain components thereof), where the client automated assistant application 116 can communicate with the cloud-based automated assistant application 13 via the one or more networks 15. In some implementations, the launch destination determination engine 113 and/or the selectable element engine 114 can be included in the cloud-based automated assistant application 13, instead of being included in the client computing device 11.

The client computing device 11 can be, for example, a cell phone, a laptop, a desktop, a notebook computer, a tablet, a smart TV, a messaging device, or a personal digital assistant (PDA), and the present disclosure is not limited thereto. The one or more servers can be, or include, for example, a web server, a proxy server, a VPN server, or any other type of server as needed. The one or more networks 15 can include, for example, a local area network (LAN), a wide area network (WAN) such as the Internet, and/or any other appropriate network.

In various implementations, the one or more additional applications 117 can be any applicable application(s) that are different from the first application 110. For instance, the one or more additional applications 117 can include a calendar application, a movie ticket application, or any other applicable application. In various implementations, the data storage 115 can include instructions, metadata (e.g., log-in information) associated with the first application 110 and/or the additional application(s) 117, or other data.

In various implementations, the cloud-based automated assistant application 13 (or similarly the client automated assistant application 116) can have a plurality of components including an automatic speech recognition (ASR) engine 131, a text-to-speech (TTS) engine 133, a natural language understanding (NLU) engine 135, and/or a fulfillment engine 137. The ASR engine 131 can process audio data that captures a spoken utterance to generate a speech recognition of the spoken utterance. The NLU engine 135 can determine semantic meaning(s) of audio (e.g., the aforementioned audio data capturing the spoken utterance) and/or a text (e.g., natural language content from a message or the aforementioned speech recognition that is converted by the ASR engine 131 from the audio data), and decompose the determined semantic meaning(s) to determine intent(s) and/or parameter(s) for an assistant action. For instance, the NLU engine 135 can process natural language content of "Weather today in Louisville?", to determine an intent (e.g., Internet search) and/or parameters (e.g., search parameters including: "weather", "today", and "Louisville", or "Weather today in Louisville?") for an assistant action (e.g., search the Internet for the weather in Louisville today).

In some implementations, the NLU engine 135 can resolve the intent(s) and/or parameter(s) based on a single utterance of a user and, in other situations, prompts can be generated based on unresolved intent(s) and/or parameter(s). In this latter situation, the generated prompts can be rendered to the user to receive user response(s), where the user response(s) to the rendered prompt(s) can be utilized by the NLU engine 135 in resolving intent(s) and/or parameter(s). Optionally, the NLU engine 135 can work in concert with a dialog manager engine (not illustrated) that determines unresolved intent(s) and/or parameter(s). For instance, the dialog manager engine can be alternatively or additionally utilized to generate the aforementioned prompt(s). In some implementations, the NLU engine 135 can utilize one or more NLU machine learning models in determining intent(s) and/or parameter(s).

In various implementations, the fulfillment engine 137 of the cloud-based automated assistant application 13 (or a fulfillment engine of the client automated assistant application 116, which is not illustrated) can receive an intent and/or parameter(s) of the intent, to fulfill the intent by performing a corresponding assistant action. As a non-limiting example, the fulfillment engine 137 can receive the aforementioned intent of Internet search and the aforementioned search parameter of "Weather today in Louisville?", to cause a search engine of the client computing device 11 to search the Internet for "Weather today in Louisville?". In this example, the fulfillment engine 137 can fulfill the intent by: (1) causing the search engine to search the Internet for the user query, i.e., "Weather today in Louisville?"), (2) generating fulfillment information (e.g., "it's cloudy outside, with a temperature of 26° C."), based on a search result (e.g., "Louisville, KY, Monday 11:00 am, cloudy, 26° C.") of the search, and/or (3) rendering the fulfillment information to the user of the client computing device 11. As another non-limiting example, the fulfillment engine 137 can receive an intent and/or parameter(s) for an assistant action that causes a thermostat in the living room to set room temperature at 72 F. In this example, the fulfillment engine 137 can fulfill the intent by generating and forwarding a control signal to the thermostat in the living room, where the control signal causes the thermostat to set the room temperature at 72 F.

Optionally, when the NLU engine 135 cannot resolve the intent(s) and/or cannot determine all parameter(s) for the intent(s), to fulfill an assistant action, the fulfillment engine 137 can generate a default response, such as "Sorry, I don't understand. Please try again. In this case, the default response can be customized based on functions or a type of the client automated assistant application 116.

In some implementations, the TTS engine 133 can convert a text (e.g., the aforementioned fulfillment information of "it's cloudy outside, with a temperature of 26° C.") to a synthesized speech using a particular voice. The synthesized speech, for instance, can be generated by using one or more trained speech synthesis neural network models to process the text. The synthesized speech can be audibly rendered via hardware speaker(s) of the client computing device 11 (e.g., a stand-alone speaker) or via another device (e.g., a cell phone).

Referring to FIG. 1C, the client automated assistant application 116 or the cloud-based automated assistant application 13 can, via the launch destination determination engine 113 and/or the selectable element engine 114, display the particular selectable element (SE) 1102A, where as a non-limiting example, the particular selectable element 1102A is embedded with a target application deeplink that, when executed, causes the target application 117A (e.g., the second application 111 in FIG. 1A) to be opened. In this example, the user can select the particular selectable element 1102A visually (e.g., touching a touch screen to select the particular selectable element 1102A, use a cursor to select the particular selectable element 1102A, etc.), or audibly (e.g., by speaking a required command or utterance).

Figure 2A:
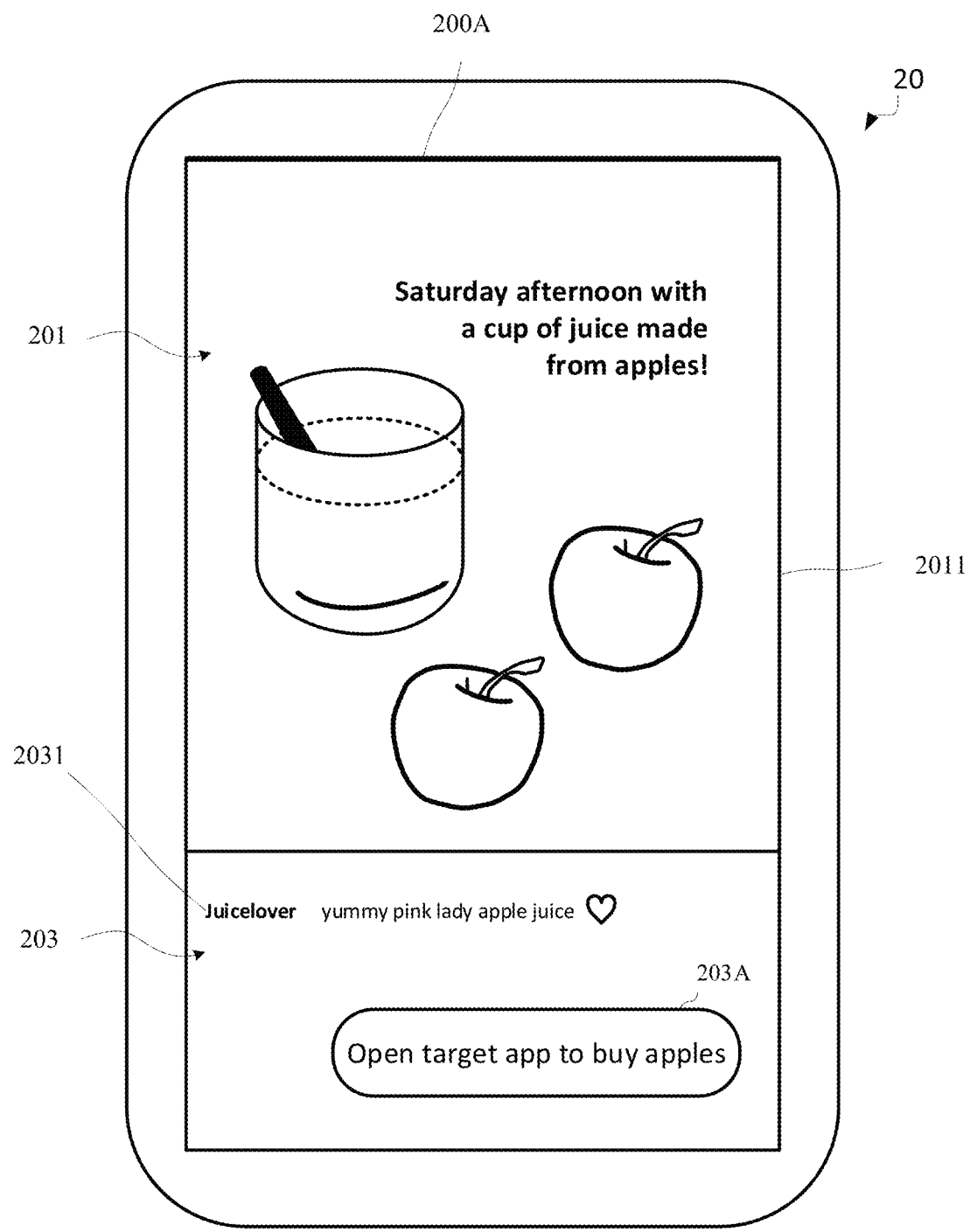
FIG. 2A illustrates an example user interface of an application that is running at a client device, in accordance with various implementations.
Figure 2B:
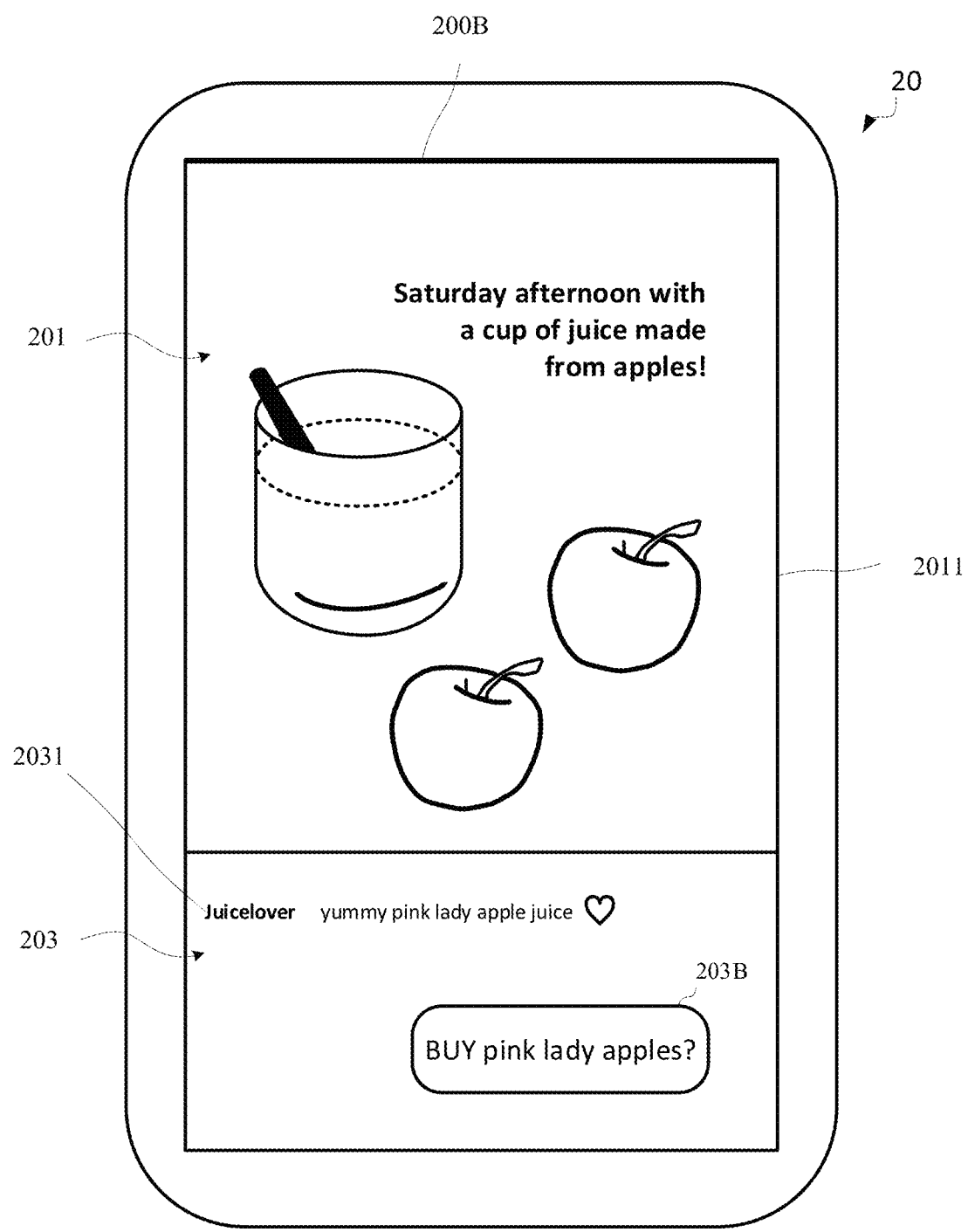
FIG. 2B illustrates another example user interface of an application that is running at a client device, in accordance with various implementations.

FIG. 2A illustrates an example user interface 200A of an application that is running at a client device 20, in accordance with various implementations. FIG. 2B illustrates another example user interface 200B of an application that is running at the client device 20, in accordance with various implementations. Similar descriptions between FIG. 2A and FIG. 2B are omitted. Referring to FIG. 2A, as a non-limiting example, the user interface 200A of a social media application that is running at the client device 20 can include a first portion 201 and a second portion 203. The first portion 201 can, for instance, include a post 2011 created and published by a friend of a user that is currently using the client device 20. The post 2011 can, for instance, include an image showing a cup of home-made juice made of pink lady apples and one or more apples. Optionally, the post 2011 can further include natural language content from the friend, i.e., "Saturday afternoon with a cup of juice made from apples!"

The second portion 203 can, for instance, include post information 2031 indicating a username of the friend that shares the post 2011, and/or a title (or description) of the post 2011, such as "yummy pink lady apples". Alternatively or additionally, the second portion 203 can, for instance, include a selectable element 203A, where the selectable element 203A can display natural language content such as "Open target app to buy apples", for interaction with the user who is browsing the post 2011. For instance, the user can select the displayed selectable element 203A, and in response to the user selecting the displayed selectable element 203A, a target application that is distinct from the application that is running at the client device 20 can be opened/launched. Optionally, the target application can be opened in a particular state, i.e., a particular user interface listing apples available to purchase.

In various implementations, the selectable element 203A can be generated by the aforementioned selectable element engine 114. In various implementations, the selectable element 203A can be selected by the aforementioned selectable element engine 114 from a plurality of candidate selectable elements. The generation of the selectable element 203A (or the selection of the selectable element 203A by the selectable element engine 114 from the plurality of candidate selectable elements) can be based on log-in information acquired by the aforementioned launch destination determination engine 113, where the log-in information can, for instance, indicate that the user has logged into the target application but not logged into a website of the target application. In this case, user selection of the selectable element 203A can cause the target application (e.g., a grocery-ordering app) to be opened. This, for example, can be realized by embedding the selectable element 203A with a URL or deeplink that leads to the launch of the target application.

Optionally, the generation of the selectable element 203A (or the selection of the selectable element 203A by the selectable element engine 114 from the plurality of candidate selectable elements) can be further based on content (e.g., the post 2011) that the user is currently browsing via the application that is running at the client device 20, in addition to being based on the log-in information acquired by the aforementioned launch destination determination engine 113. In this case, user selection of the selectable element 203A can cause the target application (e.g., a grocery-ordering app) to be opened in a particular state. For instance, the user selection of the selectable element 203A can cause a particular user interface that lists apples available to purchase, to be presented to the user of the client device 20.

Referring to FIG. 2B, instead of the selectable element 203A, the second portion 203 can, for instance, include a selectable element 203B, where the selectable element 203B can suggest an action, e.g., "BUY pink lady apples", in natural language, for interaction with the user who is browsing the post 2011. Such action of "BUY pink lady apples" can be determined for instance by the aforementioned automated assistant (client or cloud-based) to be performable via the target application or a website of the target application. In this case, in response to the user selecting the selectable element 203B, the launch destination determination engine 113 can retrieve log-in information to determine whether to launch the target application or to launch the website of the target application, for the user to perform the action of "BUY pink lady apples". For instance, if the log-in information indicates that the user is logged into the website of the target application but not logged into the target application installed at the client device 20, the website of the target application can be opened in response to the user selecting the selectable element 203B.

Figure 3A:
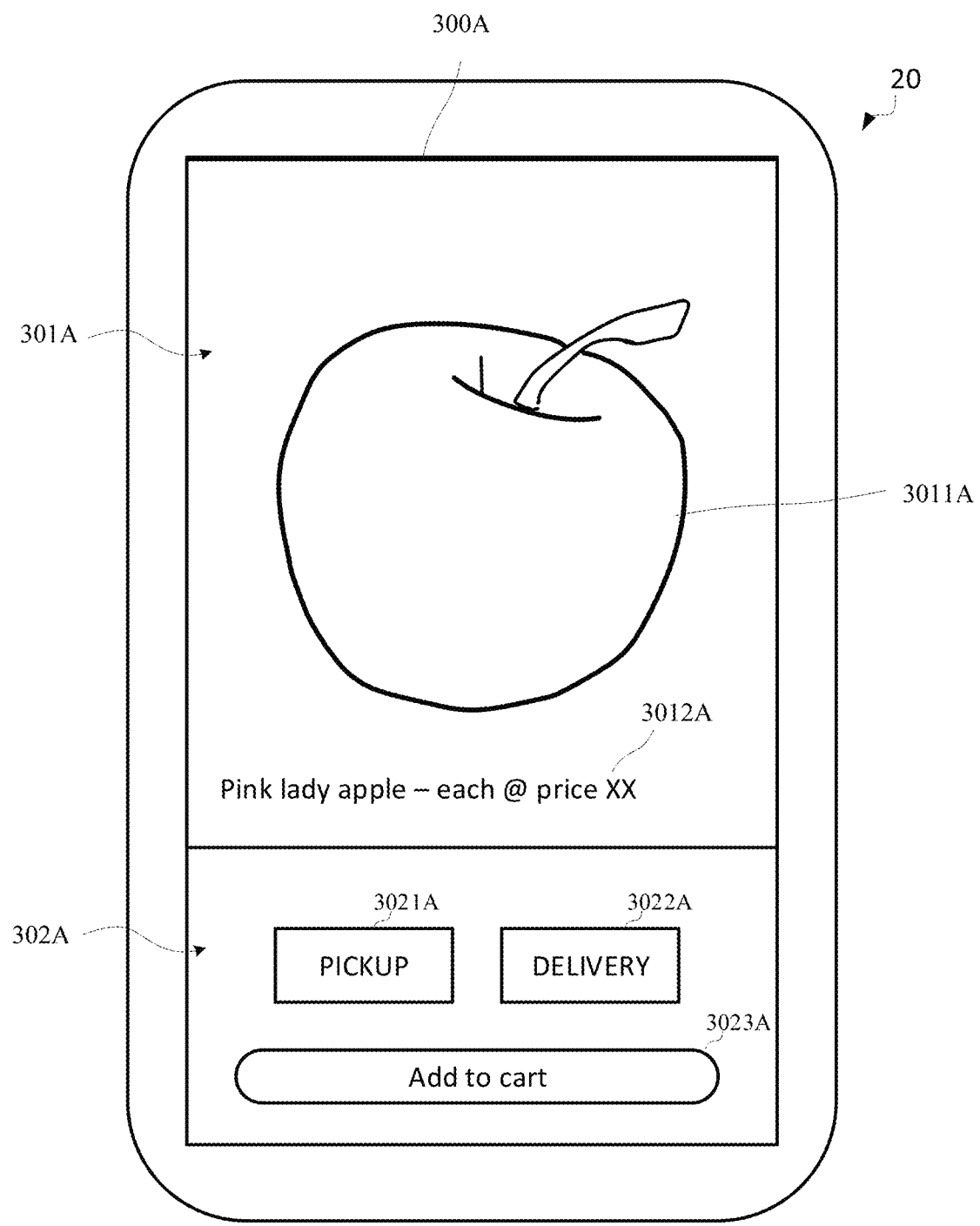
FIG. 3A illustrates an example user interface of a target application that is opened in response to a user selecting a selectable element (e.g., the selectable element 203A in FIG. 2A), in accordance with various implementations.
Figure 3B:
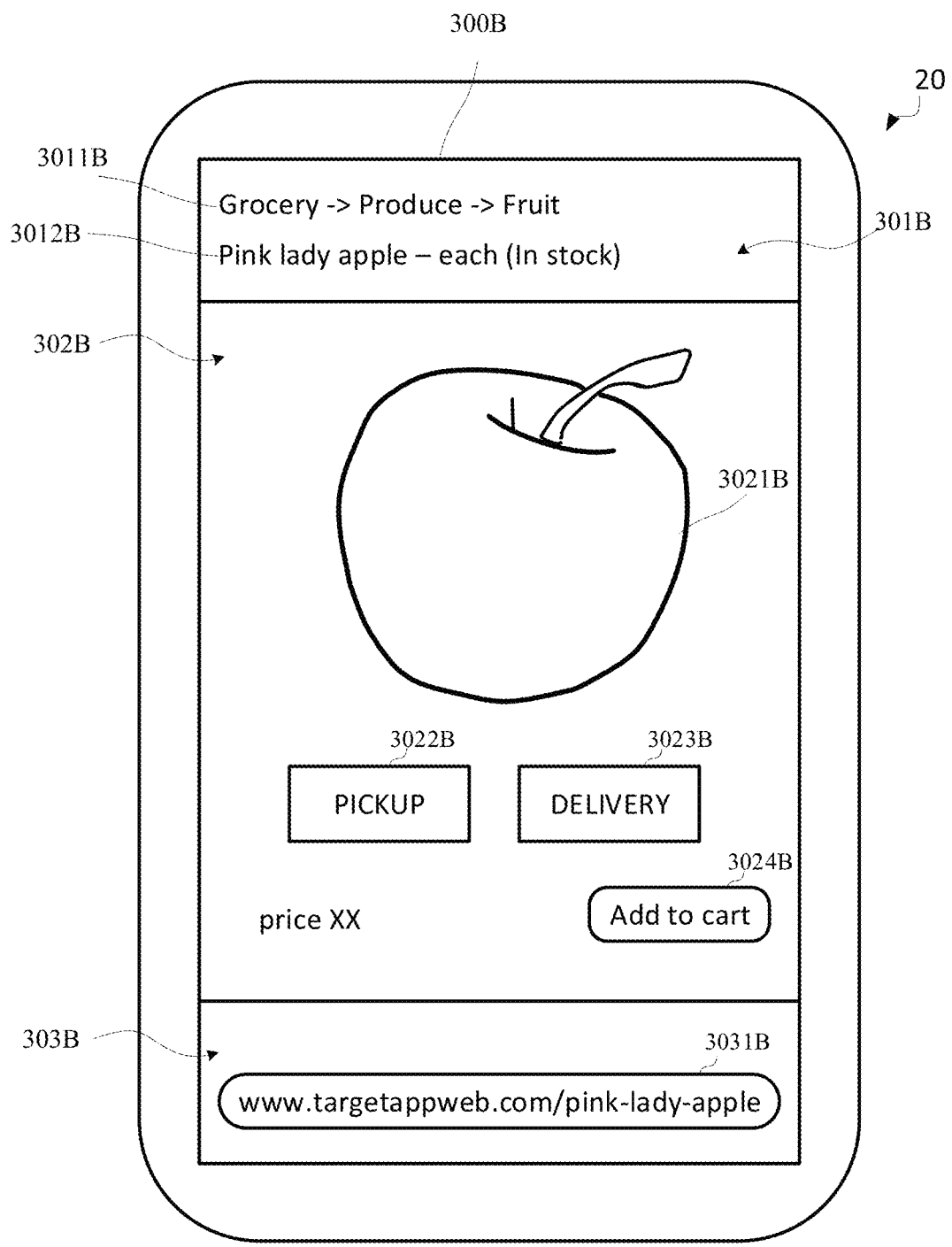
FIG. 3B illustrates an example user interface of a website of the target application in FIG. 3A, in accordance with various implementations.

FIG. 3A illustrates an example user interface 300A of a target application that is opened in response to a user selecting a selectable element (e.g., the selectable element 203A in FIG. 2A), in accordance with various implementations. FIG. 3B illustrates an example user interface 300B of a website of the target application in FIG. 3A, in accordance with various implementations. Referring to FIG. 3A, the user interface 300A of the target application (e.g., a grocery-ordering application) can include a first portion 301A and a second portion 302A. The first portion 301A can include an image 3011A of the product (e.g., pink lady apple) and a brief description 3012A (e.g., "Pink lady apple—each @ price XX") of the product. The second portion 302A can include a first selectable option 3021A to pick up and/or a second selectable option 3022A to deliver. The second portion 302A can further include a graphical element 3023A that, when selected by the user of the client device 20, adds the product (e.g., pink lady apple) to an electronic shopping cart of the target application.

Referring to FIG. 3B, the user interface 300B of the website of the target application (e.g., a website version of the grocery-ordering application) can include a first portion 301B, a second portion 302B, and a third portion 303B. The first portion 301B can include path information 3011B (i.e., Grocery→Produce→Fruit) for the product (e.g., pink lady apple). Optionally, the first portion 301B can further include product information 3012B (e.g., Pink lady apple—each (in stock)) of the product. The second portion 302B can include an image 3021B of the product, a first selectable option 3022B to PICKUP, a second selectable option 3023B to DELIVERY, and/or a Add-to-cart button 3024B that, when selected by the user of the client device 20, causes the product (e.g., the pink lady apple) to be added to the electronic shopping cart of the target application. The third portion 303B can include a website address 3031B (e.g., "www.targetappweb.com/pink-lady-apple") of the website of the target application.

Figure 4:
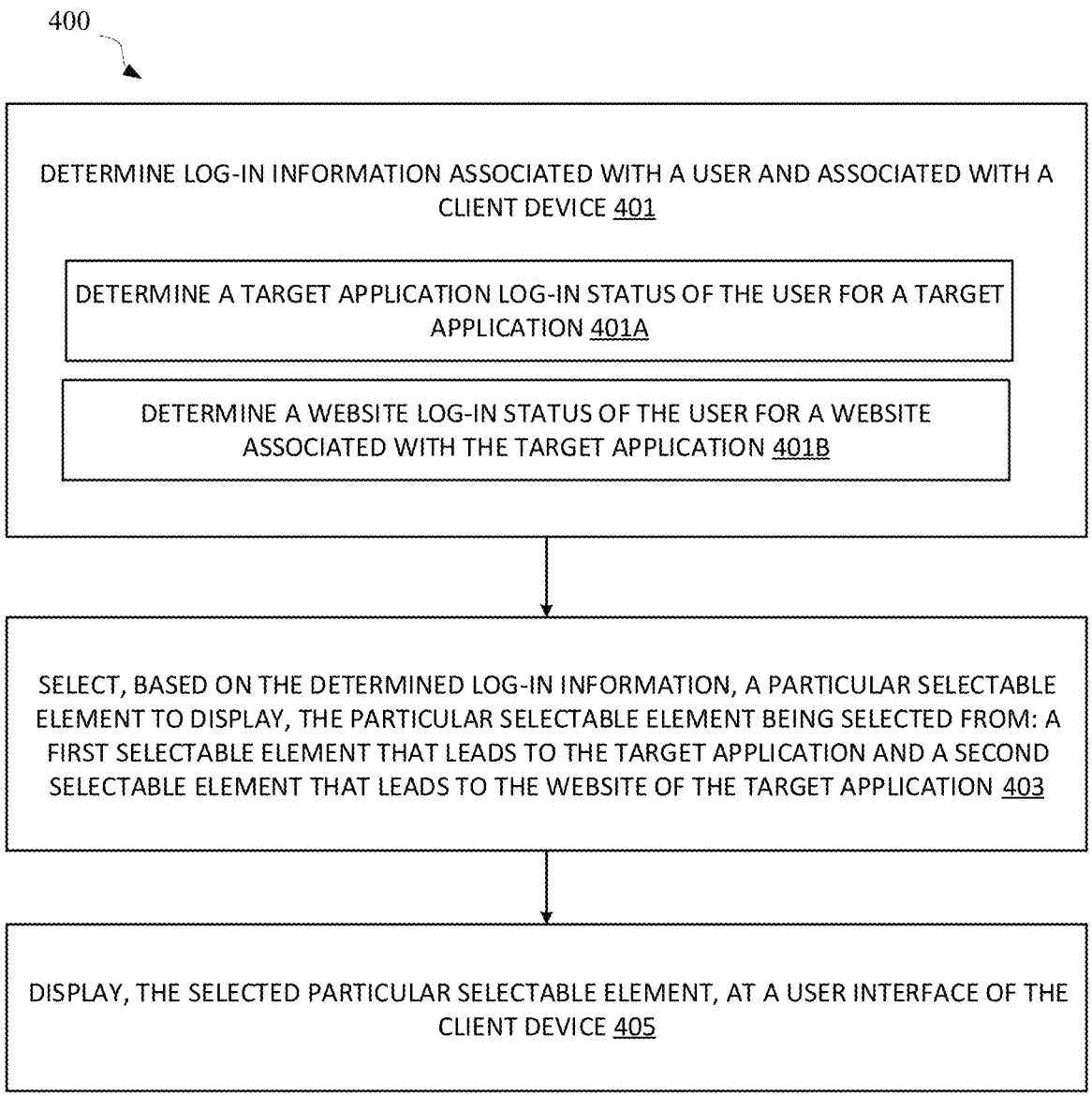
FIG. 4 illustrates a flowchart illustrating an example method for launch determination, in accordance with various implementations.

FIG. 4 illustrates a flowchart illustrating an example method 400 for launch determination, in accordance with various implementations. For convenience, the operations of the method 400 are described with reference to a system that performs the operations. The system of method 400 includes one or more processors and/or other component(s) of a client device and/or of a server device. Moreover, while operations of the method 400 are shown in a particular order, this is not meant to be limiting. One or more operations may be reordered, omitted, or added.

Referring to FIG. 4, in various implementations, at block 401, the system can determine log-in information that is shared with a client device or an application running at the client device. The log-in information can be associated with a user of the client device and can indicate at least: a target application log-in status, of a target application that is distinct from the application, the target application log-in status being shared by the target application. Alternatively or additionally, the log-in information can further indicate: a website log-in status of the user for a website that is associated with the target application but accessible independent of the target application, where the website log-in status is shared by the website of the target application.

In various implementations, at block 403, the system can select, based on the log-in information and from multiple candidate selectable elements, a particular selectable element to display at a user interface of the client device or of the application. In these implementations, the candidate selectable elements can include: a first selectable element that, when selected, causes execution of a target application deeplink for the target application; and/or a second selectable element that, when selected, causes execution of a website deeplink to the website that is associated with the target application.

In various implementations, the system can select, based on the log-in information, the particular selectable element to display by: selecting the first selectable element as the particular selectable element to display, in response to the log-in information indicating or including the target application log-in status, which shows that the user is logged into the target application. The system can further display the first selectable element at the user interface. In this case, the system can receive a user input that selects the first selectable element, and in response to receiving the user input that selects the first selectable element, the system can execute the target application deeplink. Executing the target application deeplink can cause the target application to be opened. Optionally, the target application can be opened in a particular state that is reflected in the target application deeplink.

In various implementations, the system can select, based on the log-in information, the particular selectable element to display by: determining to not display the first selectable element, in response to the log-in information indicating that the log-in status of the target application for the user shows that the user is not logged into the target application. Alternatively or additionally, in some implementations, the system can that the log-in status of the website of the target application for the user shows that the user is logged into the website of the target application, and in response, the system can determine to display the second selectable element, and display the second selectable element. In these implementations, the system can receive a user input that selects the second selectable element, and in response to receiving the user input that selects the second selectable element, the system can cause the website of the target application to be opened.

In various implementations, the system can determine that the log-in information further indicates that the log-in status of the website of the target application for the user shows that the user is not logged into the website of the target application, in addition to indicating that the log-in status of the target application for the user shows that the user is not logged into the target application. In response to such determination, the system can determine to not display the second selectable element, in addition to determining to not display the first selectable element.

In some implementations, the log-in information can include a log-in status, of a browser for the user, shared by the browser with the client device, and the candidate selectable elements include a third selectable element that, when selected, causes execution of a browser deeplink for the browser. In these implementations, when the system determines that the log-in information indicates that the user is not logged into the target application nor the website of the target application, but is logged into the browser, the system can determine to display a third selectable element that, when selected, causes the browser to be launched. For instance, the browser can be launched to show an error message or a search page. The browser can be a default web browser or another browser. Optionally, the website of the target application can be accessible via the browser described herein.

In some implementations, the system can determine that the log-in information only indicates that the user is logged into the website of the target application, and in response, the system can select to display the second selectable element at the client device. When the second selectable element is displayed, a user input selecting the second selectable element can be received. In response to receiving the user input that selects the second selectable element, the system can cause the website of the target application to be opened. Optionally, the website of the target application can be opened via a second link, the second link being specific to the website of the target application and being embedded in the second selectable element.

In some implementations, the system can determine that the log-in information only indicates that the user is not logged into the website of the target application, and in response, the system can determine to not display the second selectable element at the client device.

Figure 5:
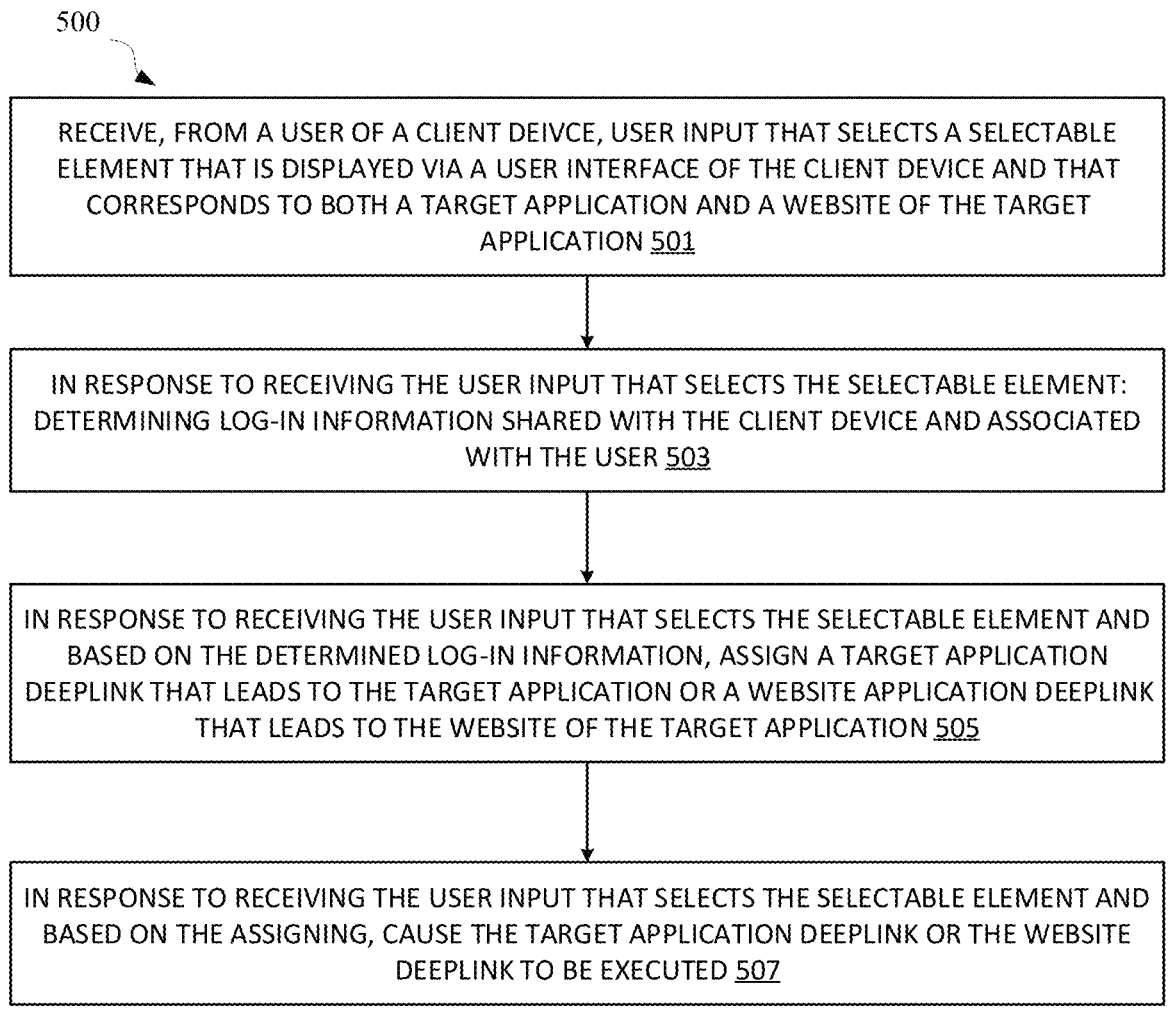
FIG. 5 is a flowchart illustrating an additional example method for launch determination, in accordance with various implementations.

FIG. 5 is a flowchart illustrating an additional example method 500 for launch determination, in accordance with various implementations. For convenience, the operations of the method 500 are described with reference to a system that performs the operations. The system of method 500 includes one or more processors and/or other component(s) of a client device and/or of a server device. Moreover, while operations of the method 500 are shown in a particular order, this is not meant to be limiting. One or more operations may be reordered, omitted, or added.

In various implementations, at block 501, the system can receive, from a user, input that selects a selectable element displayed via a user interface of a client device, where the selectable element corresponds to both a target application and a website, of the target application, that is accessible independent of the target application. In various implementations, at block 503, the system can, in response to receiving the input from the user that selects the selectable element, determine log-in information shared with the client device, and further determine, based on the log-in information, whether to open the target application or to instead open the website of the target application. The log-in information is associated with a user of the client device and can indicate at least: a target application log-in status, of a target application that is distinct from the application, the target application log-in status being shared by the target application. The log-in information can further indicate: a website log-in status of a website that is associated with the target application for the user but accessible independent of the target application, the website log-in status being shared by the website of the target application.

Figure 6:
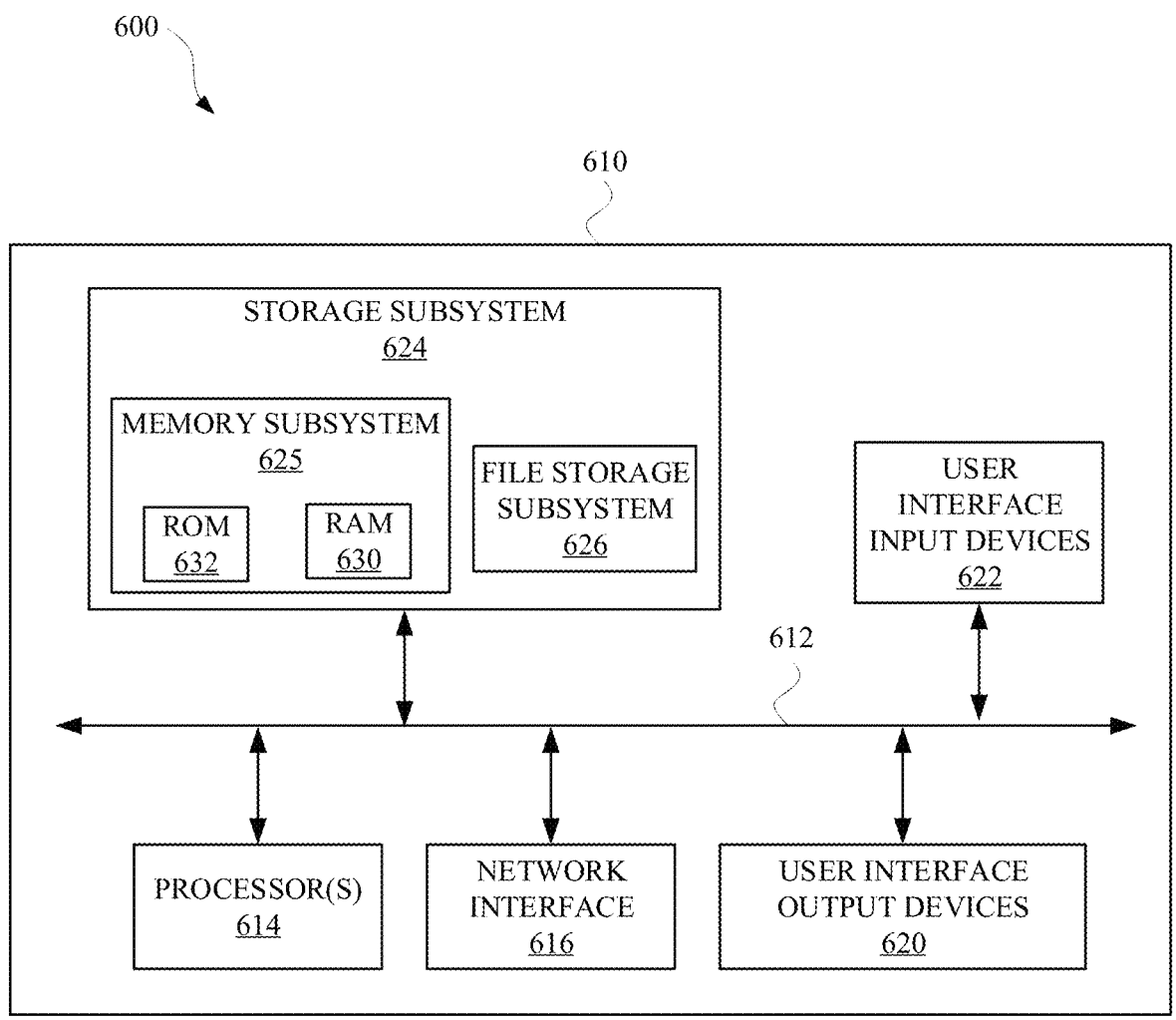
FIG. 6 illustrates an example architecture of a computing device, in accordance with various implementations.

FIG. 6 is a block diagram of an example computing device 610 that may optionally be utilized to perform one or more aspects of techniques described herein. In some implementations, one or more of a client computing device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

In various implementations, a computer-implemented method is provided and includes: determining log-in information that is associated with a client device and that is associated with a user of the client device. In some implementations, determining the log-in information can include: (1) determining a target application log-in status of the user for a target application, and (2) determining a website log-in status of the user for a website of the target application. The target application log-in status can be shared by the target application. The website of the target application can be accessible independent of the target application, and the website log-in status can be shared by the website of the target application.

In some implementations, the above computer-implemented method can further include: selecting, based on the determined log-in information and from multiple candidate selectable elements, a particular selectable element to display at a user interface of the client device or of an application currently running at the client device, where the application currently running at the client device is distinct from the target application. In some implementations, the multiple candidate selectable elements can include: a first selectable element that, when selected, causes execution of a target application deeplink that leads to the target application. In some implementations, the multiple candidate selectable elements can alternatively or additionally include: a second selectable element that, when selected, causes execution of a website deeplink that leads to the website that is associated with the target application.

In some implementations, selecting, based on the log-in information, the particular selectable element to display can include: in response to the target application log-in status of the user indicates that the user is logged into the target application, selecting the first selectable element as the particular selectable element to display. In these implementations, the method can further include: displaying the first selectable element at the user interface. In various implementations, the method can further include: receiving a user input that selects the first selectable element; and in response to receiving the user input that selects the first selectable element, executing the target application deeplink, wherein executing the target application deeplink causes the target application to be opened. Optionally, executing the target application deeplink can cause the target application to be opened in a particular state that is reflected in the target application deeplink.

In some implementations, selecting, based on the log-in information and from the multiple candidate selectable elements, the particular selectable element to display can include: in response to the target application log-in status of the user indicates that the user is not logged into the target application, determining to not display the first selectable element.

In some implementations, selecting, based on the log-in information and from the multiple candidate selectable elements, the particular selectable element to display can further include: in response to the website log-in status of the user indicates that the user is logged into the website of the target application, selecting the second selectable element as the particular selectable element to display and displaying the second selectable element at the user interface. In this case, the method can further include: receiving a user input that selects the second selectable element; and in response to receiving the user input that selects the second selectable element, causing the website of the target application to be opened.

In some implementations, selecting, based on the log-in information and from the multiple candidate selectable elements, the particular selectable element to display further includes: in response to the log-in information further indicating that the log-in status of the website of the target application for the user shows that the user is not logged into the website of the target application, determining to not display the second selectable element, in addition to determining to not display the first selectable element.

In some implementations, determining the log-in information further includes: determining a browser log-in status of the user for a browser. In these implementations, the candidate selectable elements can include a third selectable element that, when selected, causes execution of a browser deeplink that leads to the browser. In this case, selecting, based on the log-in information and from the multiple candidate selectable elements, the particular selectable element to display can further include: in response to the browser log-in status of the user indicates that the user is logged into the browser, selecting the third selectable element as the particular selectable element to display and displaying the third selectable element at the user interface.

In some implementations, the browser can be a default web browser application installed at the client device.

In some implementations, selecting, based on the log-in information and from the multiple candidate selectable elements, the particular selectable element to display can include: in response to the website log-in status of the user indicates that the user is logged into the website of the target application, selecting to display the second selectable element. In this case, the method can further include: displaying the second selectable element at the user interface. Optionally, the method can further include: receiving a user input that selects the second selectable element; and in response to receiving the user input that selects the second selectable element, causing the website of the target application to be opened. In this case, causing the website of the target application to be opened can include: executing the website deeplink that leads to the website, to open the website of the target application.

In some implementations, selecting, based on the log-in information and from the multiple candidate selectable elements, the particular selectable element to display can include: in response to the website log-in status of the user indicates that the user is not logged into the website of the target application, determining to not display the second selectable element.

In various implementations, a computer-implemented method is provided and includes: determining log-in information that is associated with a client device and that is associated with a user of the client device. In some implementations, determining the log-in information can include: determining a target application log-in status of the user for a target application, the target application log-in status being shared by the target application, and determining a website log-in status of the user for a website of the target application. The website of the target application can be accessible independent of the target application, and the website log-in status can be shared by the website of the target application.

In some implementations, the computer-implemented method can further include: generating, based on the determined log-in information, a particular selectable element to display at a user interface of the client device or of an application currently running at the client device, where the application currently running at the client devices is distinct from the target application. In some implementations, the particular selectable element is one of: a first selectable element that, when selected, causes execution of a target application deeplink that leads to the target application, or a second selectable element that, when selected, causes execution of a website deeplink that leads to the website that is associated with the target application.

In various implementations, a computer-implemented method is provided and includes: receiving, from a user, user input that selects a selectable element displayed via a user interface of a client device, where the selectable element corresponds to both a target application and a website that is associated with the target application but accessible independent of the target application. In these implementations, the computer-implemented method can further include, in response to receiving the user input that selects the selectable element: determining log-in information shared with the client device and associated with the user of the client device, assigning, based on the determined log-in information, a target application deeplink that leads to the target application or a website deeplink that leads to the website of the target application, to the selectable element, and causing, based on the assigning, the target application deeplink to be executed to open the target application or the website deeplink to be executed to open the website of the target application.

In some implementations, determining the log-in information can include: determining a target application log-in status of the user for the target application, and determining a website log-in status of the user for the website.

In some implementations, assigning, based on the determined log-in information, a target application deeplink that leads to the target application or a website deeplink that leads to the website of the target application, to the selectable element can include: (1) based on the target application log-in status of the user indicates that the user is logged into the target application, assigning the target application deeplink to the selectable element, and (2) based on the target application log-in status of the user indicates that the user is not logged into the target application and based on the website log-in status of the user indicates that the user is logged into the website of the target application, assigning the website deeplink to the selectable element.

What is claimed is:

1. A method implemented by one or more processors, the method comprising:

determining that content rendered at a client device triggers additional content or an action, the additional content or the action being accessible via a target application;

determining log-in information that is associated with a user of the client device and that is associated with the client device, the log-in information indicating whether the user of the client device is logged into the target application at the client device; and in response to the log-in information indicating that the user of the client device is logged into the target application at the client device and in response to determining that the content triggers the additional content or the action:

generating a first selectable element embedded with a target application deeplink that, when executed, causes the target application to be launched in a particular state to access the additional content or the action, and causing the first selectable element to be rendered at the client device.

2. The method of claim 1, wherein determining the log-in information that is associated with the user of the client device and that is associated with the client device includes:
acquiring the log-in information without a website log-in status, of the user for a website of the target application, being acquired, the website log-in status indicating whether the user is logged into the website of the target application at the client device.

3. The method of claim 1, wherein the log-in information further indicates whether the user of the client device is logged into a website of the target application at the client device.

4. The method of claim 3, further comprising:
in response to the log-in information indicating that the user of the client device is not logged into the target application at the client device but is logged into the website of the target application at the client device:
generating a second selectable element embedded with a website deeplink that, when executed, causes the website of the target application to be launched in a particular page to access the additional content or the action, and
causing the second selectable element to be rendered at the client device.

5. The method of claim 3, further comprising:
in response to the log-in information indicating that the user of the client device is both logged into the target application at the client device and logged into the website of the target application at the client device:
generating the first selectable element embedded with the target application deeplink that, when executed, causes the target application to be launched in the particular state to access the additional content or the action, and
causing the first selectable element to be rendered at the client device.

6. The method of claim 3, wherein the target application presents an optimized interface relative to the website of the target application.

7. The method of claim 1, wherein the content rendered at the client device is provided by an application that is running at the client device and that is distinct from the target application.

8. The method of claim 1, wherein the first selectable element displays natural language content indicating the additional content or the action.

9. The method of claim 1, wherein the first selectable element displays natural language content identifying the target application.

10. The method of claim 1, further comprising:
receiving an indication of user input that selects the first selectable element; and
in response to receiving the indication of user input that selects the first selectable element:
causing the target application to be launched in the particular state to access the additional content or the action, without additional user input to log-in the target application.

11. A system, comprising:
memory storing instructions;
one or more processors operable to execute the instructions to:

determine that content rendered at a client device triggers additional content or an action, the additional content or the action being accessible via a target application;
determine log-in information that is associated with a user of the client device and that is associated with the client device, the log-in information indicating whether the user of the client device is logged into the target application at the client device; and
in response to the log-in information indicating that the user of the client device is logged into the target application at the client device and in response to determining that the content triggers the additional content or the action:
generate a first selectable element embedded with a target application deeplink that, when executed, causes the target application to be launched in a particular state to access the additional content or the action, and
cause the first selectable element to be rendered at the client device.

12. The system of claim 11, wherein in determining the log-in information that is associated with the user of the client device and that is associated with the client device one or more of the processors are to:
acquire the log-in information without a website log-in status, of the user for a website of the target application, being acquired, the website log-in status indicating whether the user is logged into the website of the target application at the client device.

13. The system of claim 11, wherein the log-in information further indicates whether the user of the client device is logged into a website of the target application at the client device.

14. The system of claim 13, wherein one or more of the processors are further operable to execute the instructions to:
in response to the log-in information indicating that the user of the client device is not logged into the target application at the client device but is logged into the website of the target application at the client device:
generate a second selectable element embedded with a website deeplink that, when executed, causes the website of the target application to be launched in a particular page to access the additional content or the action, and p2 cause the second selectable element to be rendered at the client device.

15. The system of claim 13, wherein one or more of the processors are further operable to execute the instructions to:
in response to the log-in information indicating that the user of the client device is both logged into the target application at the client device and logged into the website of the target application at the client device: p2 generate the first selectable element embedded with the target application deeplink that, when executed, causes the target application to be launched in the particular state to access the additional content or the action, and p2 cause the first selectable element to be rendered at the client device.

16. The system of claim 13, wherein the target application presents an optimized interface relative to the website of the target application.

17. The system of claim 11, wherein the content rendered at the client device is provided by an application that is running at the client device and that is distinct from the target application.

18. The system of claim 11, wherein the first selectable element displays natural language content indicating the additional content or the action.

19. The system of claim 11, wherein the first selectable element displays natural language content identifying the target application.

20. The system of claim 11, wherein one or more of the processors are further operable to execute the instructions to:
- receive an indication of user input that selects the first selectable element; and
- in response to receiving the indication of user input that selects the first selectable element:
- cause the target application to be launched in the particular state to access the additional content or the action, without additional user input to log-in the target application.

* * * * *